United States Patent
Maaref et al.

(10) Patent No.: US 11,122,561 B2
(45) Date of Patent: *Sep. 14, 2021

(54) SYSTEM AND METHOD FOR TERMINAL COOPERATION BASED ON SPARSE MULTI-DIMENSIONAL SPREADING

(71) Applicant: Huawei Technologies Co., Ltd., Shenzhen (CN)

(72) Inventors: Amine Maaref, Kanata (CA); Mohammadhadi Baligh, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,442

(22) Filed: Jan. 4, 2018

(65) Prior Publication Data

US 2018/0132239 A1    May 10, 2018

Related U.S. Application Data

(63) Continuation of application No. 13/862,168, filed on Apr. 12, 2013, now Pat. No. 9,872,290.

(Continued)

(51) Int. Cl.
*H04W 72/04* (2009.01)
*H04L 5/00* (2006.01)
(Continued)

(52) U.S. Cl.
CPC ......... *H04W 72/0446* (2013.01); *H04J 13/00* (2013.01); *H04L 5/0016* (2013.01);
(Continued)

(58) Field of Classification Search
CPC .................................................... H04L 5/1469
See application file for complete search history.

(56) References Cited

U.S. PATENT DOCUMENTS 6,421,542 B1    7/2002    Sandler et al.
6,738,020 B1 *  5/2004    Lindskog ............. H01Q 3/2605
                                                    342/175
(Continued)

FOREIGN PATENT DOCUMENTS

CN    102365897 A      2/2012
WO    2010102435 A1    9/2010
(Continued)

OTHER PUBLICATIONS

Guo, "Virtual Full Duplex Wireless Communication Via Rapid On-Off Division Duplex" 2010 p. 1 (Year: 2010).*
(Continued)

*Primary Examiner* — Ayanah S George
(74) *Attorney, Agent, or Firm* — Slater Matsil, LLP (57) ABSTRACT

System and method embodiments are provided to achieve efficient Direct Mobile Communications (DMC) and device-to-device (D2D) communications for terminal based groups with improved spectrum efficiency, reduced interference, and virtual full duplex operation mode. The embodiments include a distributed mechanism for D2D communications that enables one or more cooperating UEs (CUEs) to help one or more target UEs (TUEs) with limited additional signaling overhead and relatively simple implementation. The mechanism comprises a grantless multi-dimensional multiplexing scheme that uses low density spreading (LDS) over time, frequency, and/or space domains to enable data forwarding between multiple half-duplex terminals or UEs while allowing the UEs to operate in virtual full-duplex mode.

37 Claims, 5 Drawing Sheets

Related U.S. Application Data (60) Provisional application No. 61/791,830, filed on Mar. 15, 2013, provisional application No. 61/737,643, filed on Dec. 14, 2012.

(51) Int. Cl.
*H04L 5/14* (2006.01)
*H04J 13/00* (2011.01)

(52) U.S. Cl.
CPC ............ *H04L 5/14* (2013.01); *H04W 72/0453* (2013.01); *H04L 5/0026* (2013.01)

(56) References Cited

U.S. PATENT DOCUMENTS

| | | |
|---|---|---|
| 2002/0181436 A1 | 12/2002 | Mueckenheim et al. |
| 2005/0193320 A1* | 9/2005 | Varnica .............. H03M 13/1111 714/800 |
| 2007/0129076 A1* | 6/2007 | Cho ...................... H04W 76/14 455/436 |
| 2007/0211814 A1 | 9/2007 | Walton et al. |
| 2007/0258509 A1 | 11/2007 | Ito et al. |
| 2008/0187034 A1 | 8/2008 | Liang et al. |
| 2009/0019168 A1 | 1/2009 | Wu et al. |
| 2009/0225874 A1* | 9/2009 | She ....................... H04L 1/0631 375/260 |
| 2010/0094554 A1* | 4/2010 | Orrell, Jr. ................ G01S 19/06 701/472 |
| 2010/0177670 A1 | 7/2010 | Hottinen |
| 2010/0240312 A1* | 9/2010 | Peng ..................... H04W 72/02 455/63.1 |
| 2011/0255450 A1* | 10/2011 | Wang ................ H04W 72/0493 370/280 |
| 2011/0258327 A1 | 10/2011 | Phan et al. |
| 2011/0268006 A1* | 11/2011 | Koskela .............. H04W 72/121 370/312 |
| 2011/0274040 A1 | 11/2011 | Pani et al. |
| 2011/0282989 A1* | 11/2011 | Geirhofer ............. H04W 8/005 709/224 |
| 2012/0014349 A1* | 1/2012 | Chung ................. H04B 7/0684 370/329 |
| 2012/0039180 A1* | 2/2012 | Kim ..................... H04L 5/0053 370/241 |
| 2012/0093098 A1 | 4/2012 | Charbit et al. |
| 2013/0044654 A1* | 2/2013 | Chen ..................... H04L 5/0023 370/280 |
| 2014/0064263 A1* | 3/2014 | Cheng .................. H04W 8/005 370/350 |

FOREIGN PATENT DOCUMENTS

| | | | | |
|---|---|---|---|---|
| WO | WO-2010102435 A1 * | 9/2010 | .......... H04L 5/0016 |
| WO | 2011131666 A1 | 10/2011 | |

OTHER PUBLICATIONS

Virtual Full Duplex Wireless Communication via Rapid On-Off division, Guo and Zhang Oct. 2010 (Year: 2010).*
Guo, D., et al., "Virtual Full-Duplex Wireless Communication via Rapid On-Off-Division Duplex," 48th Annual Allerton Conference on Communication, Control, and Computing (Allerton), Sep. 29-Oct. 1, 2010, 8 pages.
Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.
Hoshyar, R., et al., "LDS-OFDM an Efficient Multiple Access Technique," IEEE 71st Vehicular Technology Conference (VTC 2010-Spring), May 16-19, 2010, 5 pages.
Lee, L.-N., et al., "Scrambled Code Multiple Access Waveform for Micro Satellite Terminals," 2012 Military Communications Conference (MILCOM 2012), Oct. 29-Nov. 1, 2012, 6 pages.
Raghothaman, B., et al., "System Architecture for a Cellular Network with Cooperative Mobile Relay," 2011 IEEE Vehicular Technology Conference (VTC Fall), Sep. 5-8, 2011, 5 pages.
Senthuran, S., et al., "Cooperative Subcarrier and Power Allocation for a Two-Hop Decode-and-Forward OFCDM Based Relay Network," IEEE Transactions on Wireless Communications, vol. 8, No. 9, Sep. 2009, pp. 4797-4805.
Vanganuru, K., et al., "System Capacity and Coverage of a Cellular Network with D2D Mobile Relays," Military Communications Conference (MILCOM 2012), Oct. 29-Nov. 1, 2012, 6 pages.

* cited by examiner

SYSTEM AND METHOD FOR TERMINAL COOPERATION BASED ON SPARSE MULTI-DIMENSIONAL SPREADING

This application is a continuation of U.S. Non-Provisional application Ser. No. 13/862,168, filed on Apr. 12, 2013, and entitled "System and Method for Terminal Cooperation Based on Sparse Multi-Dimensional Spreading," which claims the benefit of U.S. Provisional Patent Application Ser. No. 61/791,830, filed on Mar. 15, 2013, and entitled "System and Method for Terminal Cooperation Based on Sparse Multi-Dimensional Spreading," and U.S. Provisional Patent Application Ser. No. 61/737,643 filed on Dec. 14, 2012, and entitled "System and Method for Direct Mobile Communications (DMC) Based on Two-Dimensional Low Density Spreading," all of which applications are hereby incorporated herein by reference.

TECHNICAL FIELD

The present invention relates to the field of wireless communications, and, in particular embodiments, to a system and method for device-to-device (D2D) communications based on two-dimensional low density spreading.

BACKGROUND

Direct mobile communications (DMC) and cellular controlled device to device (D2D) communications are expected to play a significant role in next generation wireless networks. With DMC, the network communicates to groups of terminals or user equipments (UEs), hereafter referred to as virtual multi-point (ViMP) nodes, instead of individual terminals. Network virtualization through terminal side cooperation (between the UEs) is expected to become part of cellular standards, such as future versions of 3GPP LTE-A and IEEE 802.16m. A ViMP node is formed of one or more target user equipments (TUEs) receiving/transmitting data from/to the network and one or more cooperating UEs (CUEs) that help the TUEs communicate with the network. Current DMC enabled systems rely on a combination of scheduling and UE grouping to enable spectrum reuse and reduce interference generated from other ViMP nodes (groups of UEs) as a result of DMC within the ViMP nodes. The interference between ViMP nodes is referred to as inter-ViMP interference (IVI). The current systems also allow half-duplex UE operation but not full duplex operation mode. There is a need for an efficient scheme for DMC (or D2D) communications that improves spectrum efficiency, reduce IVI, and allows a virtual full duplex operation mode.

SUMMARY

In accordance with an embodiment, a method for supporting user equipment (UE) group based communications includes receiving, at a UE, a plurality of data streams for a plurality of cooperating UEs (CUEs) that share time-domain channel resources through time-domain spreading multiplexing that uses time-domain sparse spreading.

In another embodiment, a method for supporting UE group based communications includes encoding and mapping, at a UE, a data stream, spreading the data stream over frequency-domain channel resources using frequency-domain spreading, and transmitting the data stream to a target UE (TUE).

In another embodiment, a UE supporting UE group based communications includes a processor and a computer readable storage medium storing programming for execution by the processor. The programming including instructions to receive a plurality of data streams for a plurality of cooperating UEs (CUEs) that share space-domain channel resources via space-domain spreading multiplexing.

In yet another embodiment, a UE supporting UE group based communications includes a processor and a computer readable storage medium storing programming for execution by the processor. The programming includes instructions to encode and map, at a UE, a data stream, spread the data stream over at least one of frequency-domain channel resources using frequency-domain spreading, over time-domain channel resources using time-domain spreading, and over space-domain channel resources using space-domain spreading, and transmit the data stream to a target UE (TUE).

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
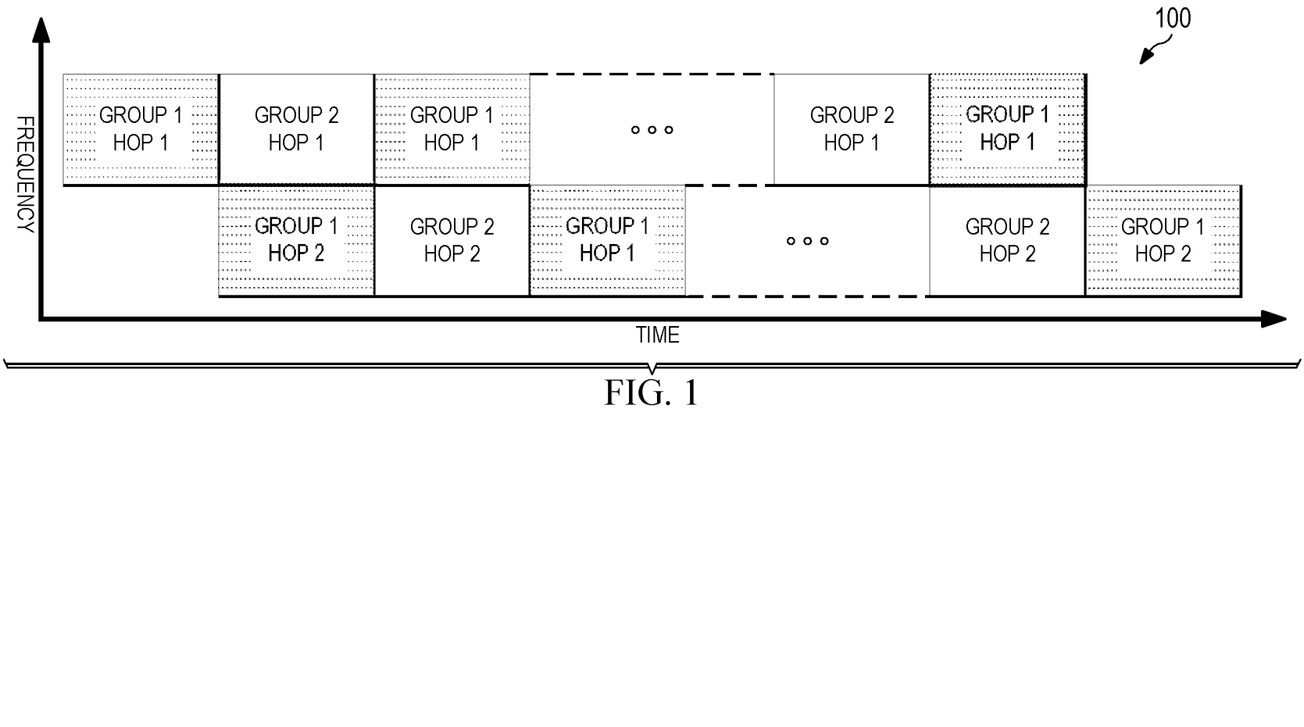
FIG. 1 illustrates a scheme that combines scheduling and UE grouping according to current systems.

FIG. 1 illustrates a scheme 100 that is used in current wireless or cellular systems to combines scheduling and UE grouping. In existing systems, target UEs (TUEs) for data packets in each cell are divided into two distinct groups. For example, the TUEs close to each other are placed in separate groups. The D2D transmissions within ViMP nodes associated with each group are done sequentially. The motive for this grouping of TUEs is to ensure that the entire spectrum is utilized all of the time, and further to reduce IVI. At each consecutive time slot or period, the groups switch frequency bands to transmit or receive.

Figure 2:
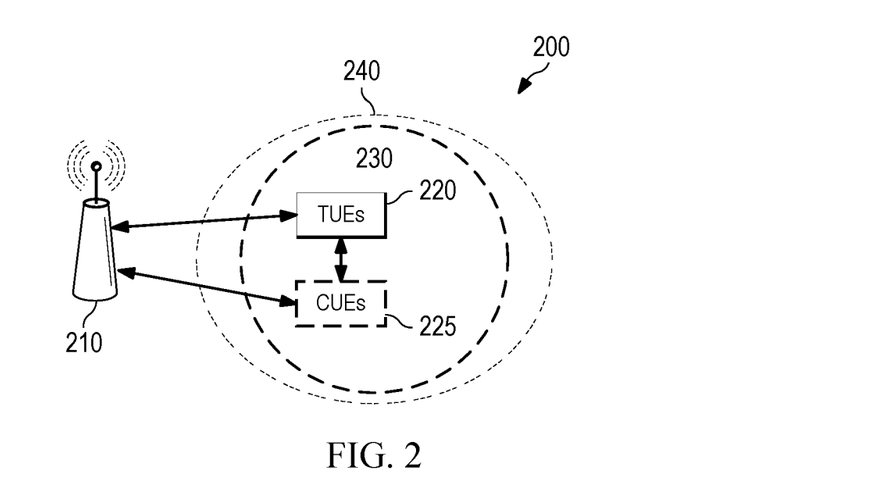
FIG. 2 illustrates a BS communicating with cooperating UEs.

FIG. 2 illustrates a scheme 200 for base station (BS) 210 communications with a group of cooperating UEs. UE cooperation provides diversity in space, time and frequency. Cooperative diversity at the terminal or UE side also increases the robustness against fading and interference. In the scheme 200, a plurality of UEs cooperate to form one or more logical/virtual multi-point (ViMP) nodes 230, for example in a coverage range or cell 240 of the BS 210. A ViMP node 230 acts as a single distributed virtual transceiver, e.g., a receiver in the downlink and a transmitter in the uplink. A ViMP node 230 may consist of a set of one or more cooperating UEs (CUEs) 225 and a set of one or more target UEs (TUEs) 220. The CUEs 225 help the TUEs 220 communicate with the BS 210 or the network, e.g., to receive data on the downlink and transmit data on the uplink.

Downlink ViMP reception involves two stages. At a first downlink broadcast phase, the BS 210 or network broadcasts a data packet to the ViMP receiver (Rx) node 230 using a ViMP Radio Network Temporary Identifier (RNTI), which is an identifier of the ViMP Rx node 230. Depending on the ViMP cooperation scenario (e.g., capacity enhancement, coverage extension, or other scenarios), both TUEs 220 and CUEs 225 may listen to the data during this phase. At second D2D data forwarding phase, the CUEs 225 forward some information to the TUEs 220 to help the TUEs 220 decode the information broadcasted by the BS 210 or network during the first phase. Information sent by the CUEs 225 during the second phase depends on the ViMP cooperation strategy (e.g., decode-and-forward (DF), amplify-and-forward (AF), joint reception (JR), or other strategies).

Typically, UEs in current systems can only operate in half-duplex mode, where either the UEs transmit or receive data at a time but cannot transmit and receive simultaneously. Therefore, in the context of ViMP reception, half-duplex CUEs cannot be simultaneously involved in both downlink reception and data forwarding phases at any given transmission time interval. Further, when D2D communications take place in the same frequency band as traditional network operations, a number of issues arise in the context of ViMP reception. For instance, the TUEs 220 may receive help from different CUEs 225, causing signal interference at any of the TUEs 220. Thus, there is a need for a multi-access (or multiplexing) scheme that enables separation at the TUEs 220 of transmissions from a plurality of CUEs 225, without incurring substantial overhead cost. Another issue is that a UE may need to act as a CUE 225 and a TUE 220 simultaneously (while communicating with different other UEs). Even though UEs may be limited by their half-duplex capability, the UEs can act as TUEs and CUEs simultaneously by operating in a logical or virtual full-duplex mode. In yet another issue, multiple CUEs 225 may share the same frequency band for spectrum efficiency purposes. Hence, there is a need to handle, during the data forwarding phase, the IVI interference generated or cause by the D2D transmissions from different ViMP nodes 230.

System and method embodiments are provided herein to achieve efficient DMC and D2D communications with improved spectrum efficiency, reduced IVI, and virtual full duplex operation mode. The embodiments include a distributed mechanism for D2D communications that enables multiple CUEs to help multiple TUEs with limited additional signaling overhead and relatively simple implementation. The mechanism comprises a grantless two-dimensional multiplexing scheme that uses low density spreading (LDS) over time, frequency and/or space domains to enable data forwarding between multiple half-duplex terminals or UEs, e.g., within a given frequency band, while allowing the UEs to operate in virtual full-duplex mode.

In addition to enabling a half-duplex CUE to operate in virtual full-duplex mode, the mechanism also allows full reuse of the spectrum for D2D data forwarding within multiple ViMP nodes while minimizing the IVI. The signatures for the two-dimensional LDS multiplexing scheme are UE specific and can be pre-assigned or acquired based on the UE connection ID. If the signatures are network assigned, terminals can be informed of the assigned signature by the network through a broadcast channel or radio resource control (RRC) signaling. The terms terminals and UEs are used herein interchangeably to refer to any device that can communicate with a wireless network, e.g., via a BS. Examples of a terminal or UE include a smartphone, a desktop computer, or any other mobile or personal device enabled for wireless communications.

Figure 3:
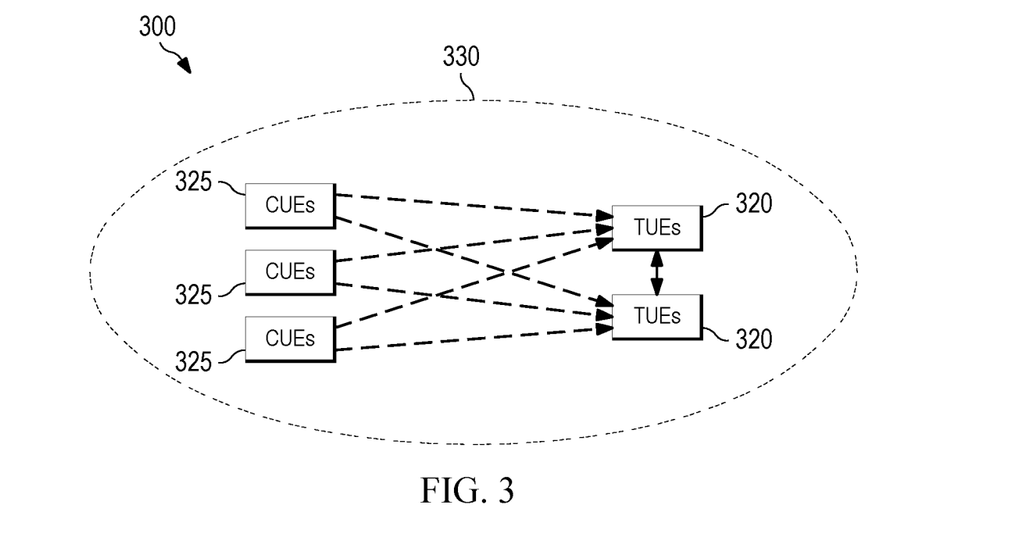
FIG. 3 illustrates D2D communications with UE cooperation.

FIG. 3 illustrates a system 300 for D2D communications with UE cooperation. A plurality of UEs cooperate to form a logical/virtual multi-point (ViMP) node 330 acting as single distributed virtual transceiver. The term ViMP node is also be referred to herein as a UE group or a group of cooperating UEs. A ViMP node 330 includes a set of target UEs (TUEs) 320 and cooperating UEs (CUEs) 325. The CUEs 325 help the TUEs 120 communicate with a wireless network (not shown), e.g., to receive data on the downlink and/or transmit data on the uplink. As such, the UEs of the ViMP node 330 can jointly transmit data on the uplink channel and jointly receive data on the downlink channel. The TUEs 320 need to distinguish between the signals received from different CUEs 325 during the data forwarding phase. The TUEs 320 may also act as CUEs 325 for each other. Since all D2D transmissions share the same frequency band, there may be interference or IVI originating from D2D transmissions in other ViMP nodes (not shown). Close-range D2D transmissions can be used in order to reduce the deleterious effects of IVI. Still, if two TUEs in different ViMP nodes are located in sufficiently close proximity, then their respective ViMP nodes can cause IVI to each other.

Figure 4:
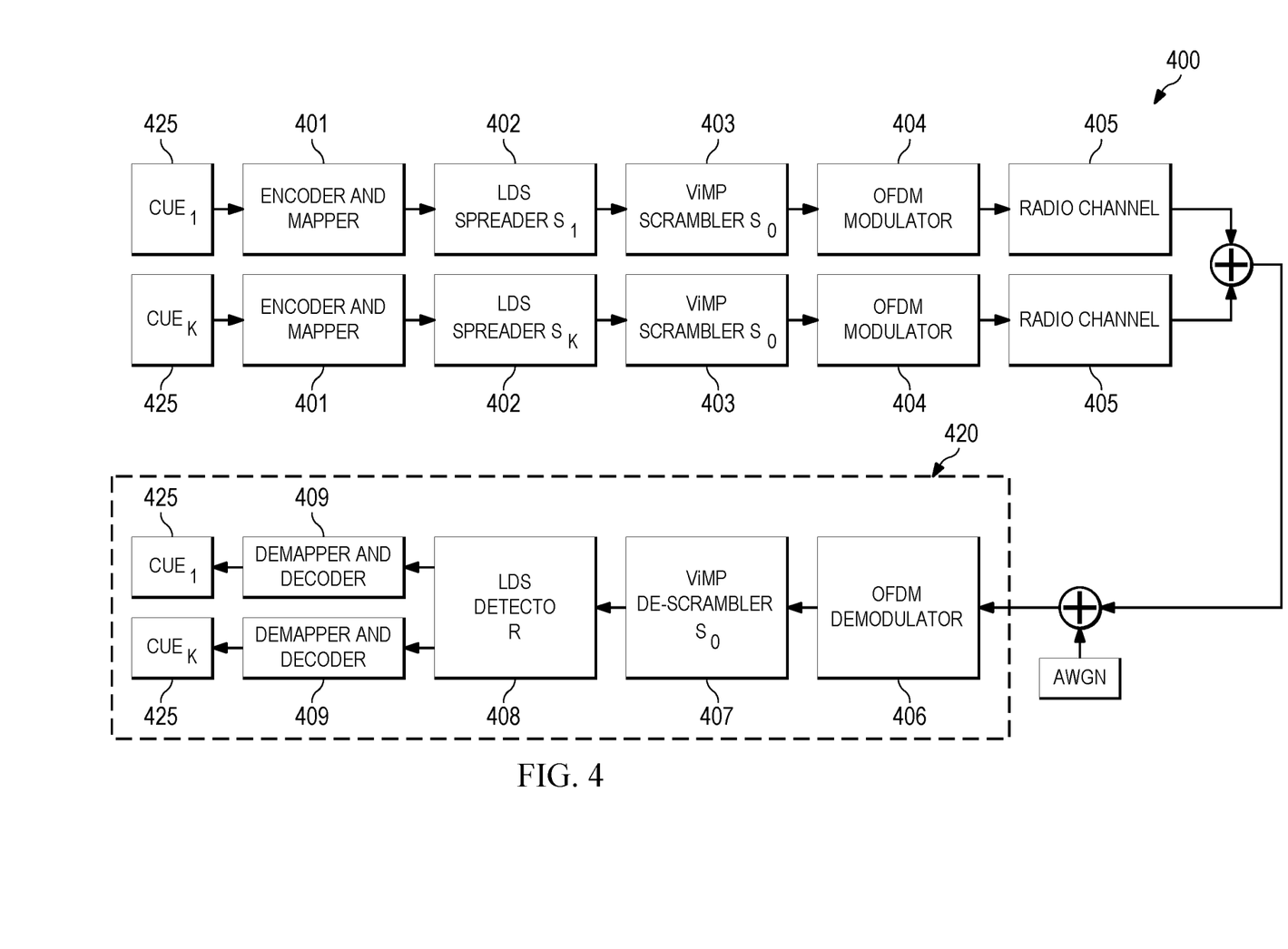
FIG. 4 illustrates an embodiment of a D2D transmission scheme using LDS-OFDM.

FIG. 4 illustrates an embodiment of a D2D transmission scheme 400 using LDS-Orthogonal frequency-division multiplexing (OFDM). The scheme 400 can be implemented in the system 300 to reduce IVI. First, data streams of a plurality of CUEs 425 ($CUE_l$ to $CUE_k$, where k is an integer) are spread using a low density spreading (LDS) sequence. The CUEs 425 may be located in one or more ViMP nodes. The data stream of each CUE 425 can be encoded and mapped at an encoder and mapper block 401, and then spread using a corresponding LDS spreader 402. Next, the resulting LDS sequences ($S_1$ to $S_k$) of the CUEs 425 are multiplied by ViMP node specific scrambling sequences, the effect of which is to whiten the IVI (introduce white noise characteristics). The spread data stream of each CUE 435 is scrambled using a corresponding ViMP scrambler 403 and then modulated using an OFDM modulator 404. The resulting scrambled sequence ($S_0$) for the CUEs 435 is then transmitted over the different subcarriers using corresponding radio channel transmitters 405. The combination of the transmitted sequences over the air is received by a receiver of a TUE 420 within sufficient proximity, e.g., within the same ViMP node of the CUEs 435. The TUE 420 may also receive data corresponding to CUEs 425 in other ViMP nodes of the TUE 420.

At the TUE 420, the received combination of sequences may also include added noise, for instance Additive white Gaussian noise (AWGN). The received combination of sequences is demodulated via an OFDM demodulator 406 and then descrambled at a ViMP descrambler 407 using the same ViMP scrambling sequence used in the ViMP scrambler 403 at the transmitter side. The resulting sequences are then processed by a LDS detector 408 to separate the combination of sequences into individual sequences corresponding to the different CUEs 425. For instance, the data streams for each virtual multi-point (ViMP) Radio node are separated according to a corresponding ViMP RNTI, and the data streams for each of the CUEs are separated according to a corresponding UE connection ID. Each sequence is then decoded by a mapper and decoder 409 to obtain the original data streams of the CUEs 425, e.g., of the same ViMP node or communicating with the TUE 420.

Figure 5:
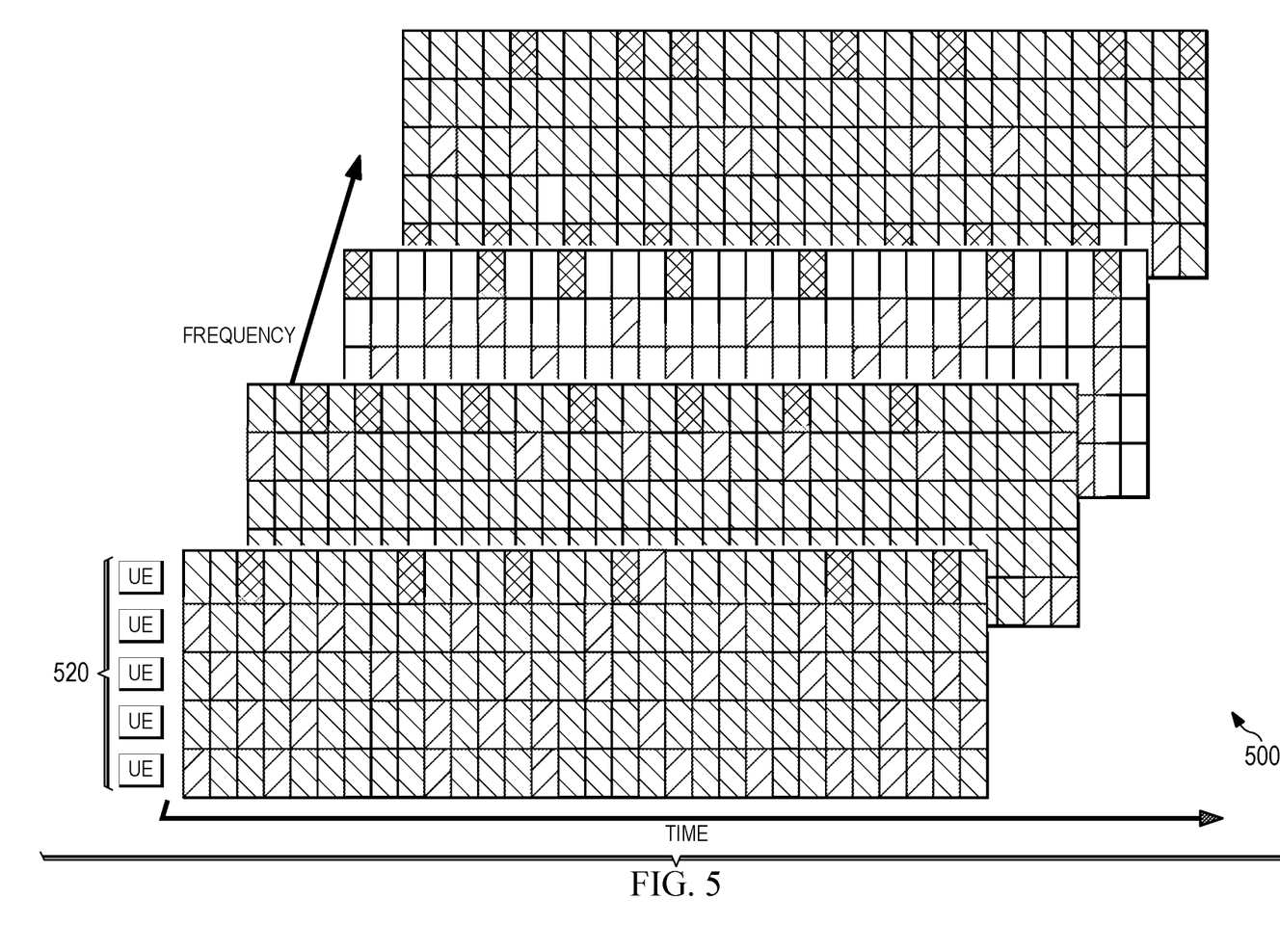
FIG. 5 illustrates a embodiment scheme for two-dimensional low density spreading (LDS) multiplexing.

FIG. 5 illustrates an embodiment scheme 500 for two-dimensional LDS multiplexing over both time and frequency grids. For instance, the scheme 500 may be used to spread the data streams of the different CUEs 425 in the scheme 400 or to spread communications of the different CUEs 325 and TUEs 320 in the system 300. The data streams in the stream scheme 500 are spread using LDS in both time and frequency-domains. The data streams share frequency-domain channel resources via frequency-domain LDS multiplexing and share time-domain channel resources through time-domain LDS multiplexing. The time-domain spreading and the frequency-domain spreading can be independent of each other. With respect to LDS in the time-domain, a plurality of half-duplex UEs 520 can forward data to each other within the same ViMP node, e.g., the UEs 520 simultaneously act as TUEs and CUEs. Thus, the UEs 520 need to listen and talk at the same time. However, the half-duplex constraint means the received signal over any subcarrier within a given transmission time interval (TTI) needs to be replaced with the subcarrier's transmitted signal over the same TTI. To overcome this, signals from TUEs are spread using LDS time-domain sequences. Specifically, transmission-off slots (zero or no transmission slots) of the time-domain LDS signatures are introduced to allow data reception at those slots, thereby achieving virtual full-duplex operation in the time-domain. Due to the LDS of the time-domain spreading, collisions in the time-domain can be allowed and data can still be recovered at the intended receivers, for instance using iterative message passing algorithms (MPA) with linear complexity. A TUE can apply a MPA over the two-dimensional time-frequency grid of the scheme 500 to recover the signals forwarded by all CUEs within the same ViMP node.

As described above, the grantless LDS scheme over both time and frequency grids includes a plurality of benefits. The LDS over time allows virtual full-duplex operation, thereby overcoming the half-duplex UE constraint. Further, the LDS over frequency acts as a channelization code to allow multiple CUEs to share the same frequency band with no additional signaling overhead. The signatures are UE specific and can be pre-assigned or acquired based on a UE connection ID. Additionally, a ViMP-specific scrambling code is used which allows whitening the effects of IVI, thereby allowing D2D communications for different UEs to share the same frequency band without causing substantial interference. The embodiments herein may be implemented in, for example, any wireless cellular network with D2D enhanced capability including but not limited to 3GPP LTE, LTE-A and IEEE WiMAX for instance.

Figure 6:
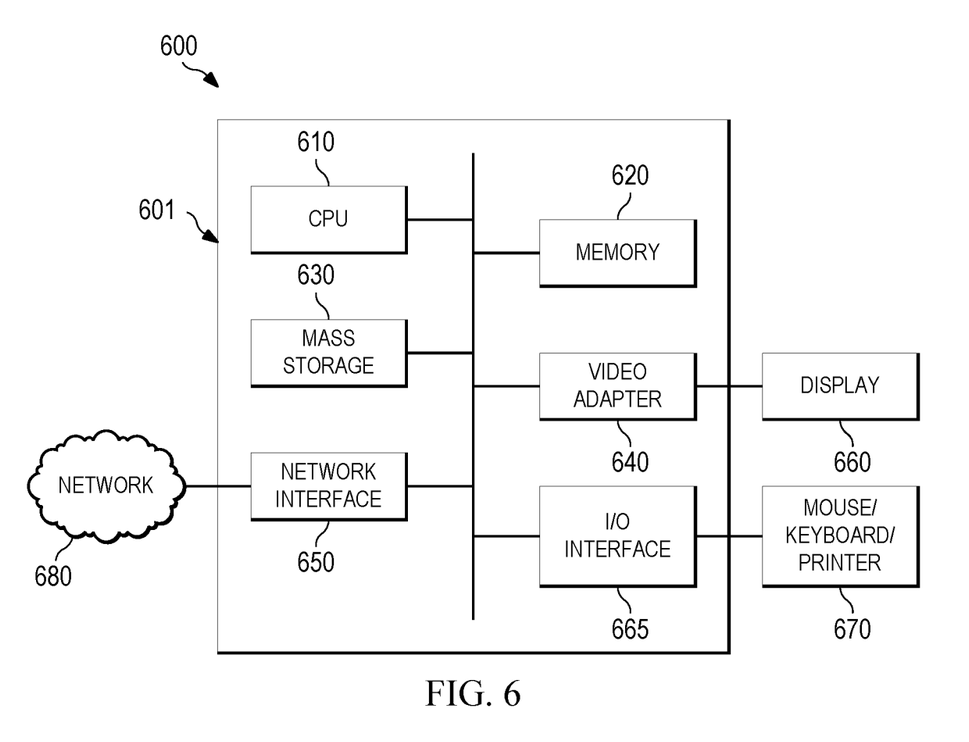
FIG. 6 illustrates a processing system that can be used to implement various embodiments.

FIG. 6 is a block diagram of a processing system 600 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, a memory 620, a mass storage device 630, a video adapter 640, and an I/O interface 665 connected to a bus. The bus may be one or more of any type of several bus architectures including a memory bus or memory controller, a peripheral bus, a video bus, or the like.

The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. The mass storage device 630 may comprise any type of storage device configured to store data, programs, and other information and to make the data, programs, and other information accessible via the bus. The mass storage device 630 may comprise, for example, one or more of a solid state drive, hard disk drive, a magnetic disk drive, an optical disk drive, or the like.

The video adapter 640 and the I/O interface 665 provide interfaces to couple external input and output devices to the processing unit. As illustrated, examples of input and output devices include a display 660 coupled to the video adapter 640 and any combination of mouse/keyboard/printer 670 coupled to the I/O interface 665. Other devices may be coupled to the processing unit 601, and additional or fewer interface cards may be utilized. For example, a serial interface card (not shown) may be used to provide a serial interface for a printer.

The processing unit 601 also includes one or more network interfaces 650, which may comprise wired links, such as an Ethernet cable or the like, and/or wireless links to access nodes or one or more networks 680. The network interface 650 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
transmitting, by a first apparatus to a second apparatus, a data stream,
wherein the data stream is mapped to frequency-domain channel resources of a set of device-to-device (D2D) resources and to time-domain channel resources of the set of D2D resources, the set of D2D resources for data transmission or data reception, wherein the frequency-domain channel resources and the time-domain channel resources are mapped in accordance with a frequency-domain multiplexing sequence of the first apparatus and a time-domain multiplexing sequence of the first apparatus, wherein the frequency-domain multiplexing sequence of the first apparatus indicates the frequency-domain channel resources of the set of D2D resources used by the first apparatus for transmission of the data stream, wherein the time-domain multiplexing sequence of the first apparatus indicates the time-domain channel resources of the set of D2D resources used by the first apparatus for the transmission of the data stream, and wherein the time-domain multiplexing sequence and the frequency-domain multiplexing sequence are independent from each other.

2. The method of claim 1, wherein the transmitting the data stream comprises:

transmitting the data stream to the second apparatus and another apparatus.

3. The method of claim 1, further comprising:

receiving, by the first apparatus from a network device, a user equipment (UE)-specific radio resource control (RRC) signaling, the RRC signaling comprising an indication of the time-domain multiplexing sequence and the frequency-domain multiplexing sequence.

4. The method of claim 1, wherein the time-domain multiplexing sequence and the frequency-domain multiplexing sequence are assigned to the first apparatus by a network device.

5. The method of claim 1, wherein the time-domain multiplexing sequence and the frequency-domain multiplexing sequence are acquired by the first apparatus without receiving a grant of the time-domain multiplexing sequence and the frequency-domain multiplexing sequence from a network device.

6. The method of claim 1, wherein the first apparatus operates in a half-duplex mode.

7. The method of claim 1, wherein the second apparatus operates in a half-duplex mode.

8. A method, comprising:

receiving, by a first apparatus from a second apparatus, a data stream, wherein the data stream is demapped from frequency-domain channel resources of a set of device-to-device (D2D) resources and time-domain channel resources of the set of D2D resources, the set of D2D resources for data transmission or data reception, wherein the frequency-domain channel resources and the time-domain channel resources are demapped in accordance with a frequency-domain multiplexing sequence of the second apparatus and a time-domain multiplexing sequence of the second apparatus, wherein the frequency-domain multiplexing sequence of the second apparatus indicates the frequency-domain channel resources of the set of D2D resources used by the second apparatus for transmission of the data stream, wherein the time-domain multiplexing sequence of the second apparatus indicates the time-domain channel resources of the set of D2D resources used by the second apparatus for the transmission of the data stream, and wherein the time-domain multiplexing sequence and the frequency-domain multiplexing sequence are independent from each other.

9. The method of claim 8, wherein receiving the data stream comprises:

receiving more than one data stream from the second apparatus, or from the second apparatus and another apparatus.

10. The method of claim 8, wherein a user equipment (UE)-specific radio resource control (RRC) signaling for the second apparatus comprises an indication of the time-domain multiplexing sequence and the frequency-domain multiplexing sequence.

11. The method of claim 8, wherein the time-domain multiplexing sequence and the frequency-domain multiplexing sequence are assigned by a network device to the second apparatus.

12. The method of claim 8, wherein the time-domain multiplexing sequence and the frequency-domain multiplexing sequence are acquired by the second apparatus without receiving a grant of the time-domain multiplexing sequence and the frequency-domain multiplexing sequence from a network device.

13. The method of claim 8, wherein the first apparatus operates in a half-duplex mode.

14. The method of claim 8, wherein the second apparatus operates in a half-duplex mode.

15. An apparatus, comprising:

at least one processor; and a non-transitory computer readable storage medium coupled to the at least one processor, the non-transitory computer readable storage medium storing programming for execution by the at least one processor to perform operations, the operations comprising:

transmitting, to a second apparatus, a data stream, wherein the data stream is mapped to frequency-domain channel resources of a set of device-to-device (D2D) resources and to time-domain channel resources of the set of D2D resources, the set of D2D resources for data transmission or data reception, wherein the frequency-domain channel resources and the time-domain channel resources are mapped in accordance with a frequency-domain multiplexing sequence of the apparatus and a time-domain multiplexing sequence of the apparatus, wherein the frequency-domain multiplexing sequence of the apparatus indicates the frequency-domain channel resources of the set of D2D resources used by the apparatus for transmission of the data stream, wherein the time-domain multiplexing sequence of the apparatus indicates the time-domain channel resources of the set of D2D resources used by the apparatus for the transmission of the data stream, and wherein the time-domain multiplexing sequence and the frequency-domain multiplexing sequence are independent from each other.

16. The apparatus of claim 15, wherein the transmitting the data stream comprises:

transmitting the data stream to the second apparatus and another apparatus.

17. The apparatus of claim 15, the operations further comprising:

receiving, from a network device, a user equipment (UE)-specific radio resource control (RRC) signaling, the RRC signaling comprising an indication of the time-domain multiplexing sequence and the frequency-domain multiplexing sequence.

18. The apparatus of claim 15, wherein the time-domain multiplexing sequence and the frequency-domain multiplexing sequence are assigned to the apparatus by a network device.

19. The apparatus of claim 15, wherein the time-domain multiplexing sequence and the frequency-domain multiplexing sequence are acquired by the apparatus without receiving a grant of the time-domain multiplexing sequence and the frequency-domain multiplexing sequence from a network device.

20. The apparatus of claim 15, wherein the apparatus operates in a half-duplex mode.

21. The apparatus of claim 15, wherein the second apparatus operates in a half-duplex mode.

22. An apparatus, comprising:
at least one processor; and
a non-transitory computer readable storage medium coupled to the at least one processor, the non-transitory computer readable storage medium storing programming for execution by the at least one processor to perform operations, the operations comprising:
receiving, from a second apparatus, a data stream,
wherein the data stream is demapped from frequency-domain channel resources of a set of device-to-device (D2D) resources and time-domain channel resources of the set of D2D resources, the set of D2D resources for data transmission or data reception,
wherein the frequency-domain channel resources and the time-domain channel resources are demapped in accordance with a frequency-domain multiplexing sequence of the second apparatus and a time-domain multiplexing sequence of the second apparatus,
wherein the frequency-domain multiplexing sequence of the second apparatus indicates the frequency-domain channel resources of the set of D2D resources used by the second apparatus for transmission of the data stream,
wherein the time-domain multiplexing sequence of the second apparatus indicates the time-domain channel resources of the set of D2D resources used by the second apparatus for the transmission of the data stream, and
wherein the time-domain multiplexing sequence and the frequency-domain multiplexing sequence are independent from each other.

23. The apparatus of claim 22, wherein receiving the data stream comprises:
receiving more than one data stream from the second apparatus, or from the second apparatus and another apparatus.

24. The apparatus of claim 22, wherein a user equipment (UE)-specific radio resource control (RRC) signaling for the second apparatus comprises an indication of the time-domain multiplexing sequence and the frequency-domain multiplexing sequence.

25. The apparatus of claim 22, wherein the time-domain multiplexing sequence and the frequency-domain multiplexing sequence are assigned by a network device to the second apparatus.

26. The apparatus of claim 22, wherein the time-domain multiplexing sequence and the frequency-domain multiplexing sequence are acquired by the second apparatus without receiving a grant of the time-domain multiplexing sequence and the frequency-domain multiplexing sequence from a network device.

27. The apparatus of claim 22, wherein the apparatus operates in a half-duplex mode.

28. The apparatus of claim 22, wherein the second apparatus operates in a half-duplex mode.

29. The method of claim 1, wherein the data stream is repeated across the frequency-domain channel resources and the time-domain channel resources indicated by the frequency-domain multiplexing sequence and the time-domain multiplexing sequence.

30. The method of claim 8, wherein the data stream is repeated across the frequency-domain channel resources and the time-domain channel resources indicated by the frequency-domain multiplexing sequence and the time-domain multiplexing sequence.

31. The apparatus of claim 15, wherein the data stream is repeated across the frequency-domain channel resources and the time-domain channel resources indicated by the frequency-domain multiplexing sequence and the time-domain multiplexing sequence.

32. The apparatus of claim 22, wherein the data stream is repeated across the frequency-domain channel resources and the time-domain channel resources indicated by the frequency-domain multiplexing sequence and the time-domain multiplexing sequence.

33. The method of claim 1, wherein the time-domain multiplexing sequence indicates the time-domain channel resources of the set of D2D resources used for the transmission of the data stream in a unit of slot.

34. The method of claim 8, wherein the time-domain multiplexing sequence indicates the time-domain channel resources of the set of D2D resources used for the transmission of the data stream in a unit of slot.

35. The apparatus of claim 15, wherein the time-domain multiplexing sequence indicates the time-domain channel resources of the set of D2D resources used for the transmission of the data stream in a unit of slot.

36. The apparatus of claim 22, wherein the time-domain multiplexing sequence indicates the time-domain channel resources of the set of D2D resources used for the transmission of the data stream in a unit of slot.

37. The method of claim 1, wherein the first apparatus operates in a half-duplex mode, and the frequency-domain multiplexing sequence enables the first apparatus for virtual full-duplex operations.

* * * * *